United States Patent [19]
Wrzesinski

[11] Patent Number: 5,124,616
[45] Date of Patent: Jun. 23, 1992

[54] CIRCUIT FOR DRIVING A LOAD AND FOR PRODUCING A SIGNAL INDICATIVE OF THE CONDITION OF THE LOAD

[75] Inventor: Stanley Wrzesinski, Arlington Heights, Ill.

[73] Assignee: Motorola, Inc., Schaumburg, Ill.

[21] Appl. No.: 608,941

[22] Filed: Nov. 5, 1990

[51] Int. Cl.$^5$ .............................................. G05F 1/573
[52] U.S. Cl. ..................................... 323/284; 323/285; 323/908; 340/458
[58] Field of Search ................. 323/282, 283, 284, 285, 323/908; 340/438, 458

[56] References Cited
U.S. PATENT DOCUMENTS

| | | | |
|---|---|---|---|
| 4,575,673 | 3/1986 | Tedeschi et al. | 323/285 |
| 4,584,555 | 4/1986 | Domorazek | 340/458 |
| 4,841,219 | 6/1989 | Lonergan | 323/274 |
| 4,849,683 | 7/1989 | Flolid | 323/284 |

*Primary Examiner*—Peter S. Wong
*Attorney, Agent, or Firm*—Peter D. Hudson

[57] ABSTRACT

A drive circuit for driving a capacitive load (4) and for producing a signal (FIG. 2b, 3b, 4b, 5b) indicative of the condition of the load, the circuit comprising: a FET (26) applying current to the load; a resistance (30) sensing the level of the applied current; a differential amplifier (32) detecting when the sensed level exceeds a predetermined threshold; and a bipolar transistor producing a control signal (FIG. 2b, 3b, 4b, 5b) to limit the applied current until the load current falls below the threshold, whereby the control signal is a pulse width modulated signal whose pulse width is indicative of the condition of the load.

11 Claims, 2 Drawing Sheets

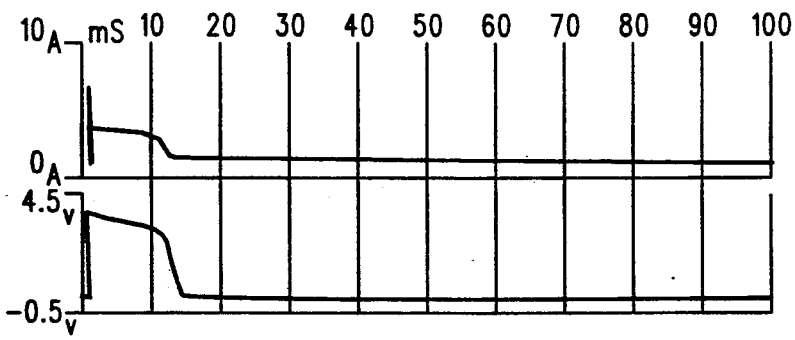
*FIG.2A*
*FIG.2B*
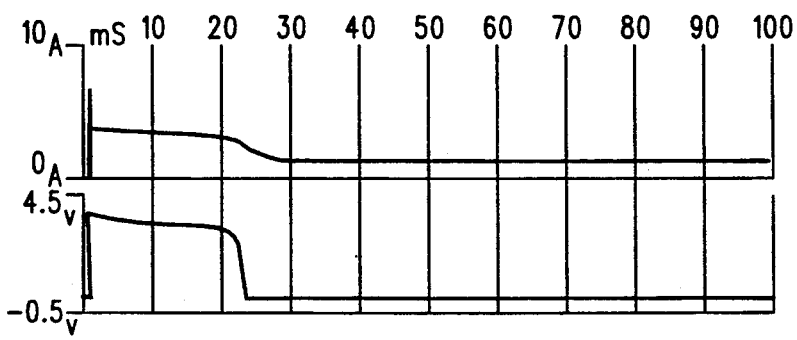
*FIG.3A*
*FIG.3B*
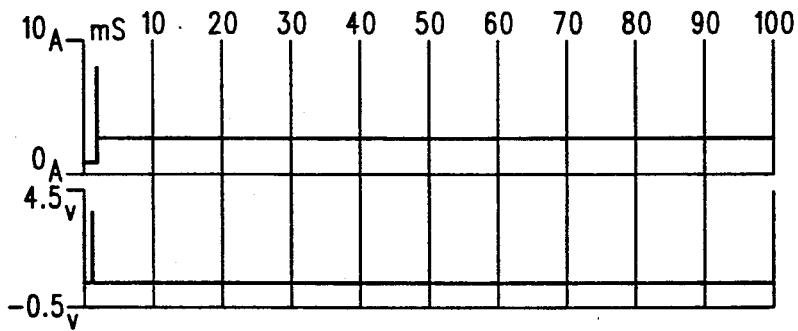
*FIG.4A*
*FIG.4B*
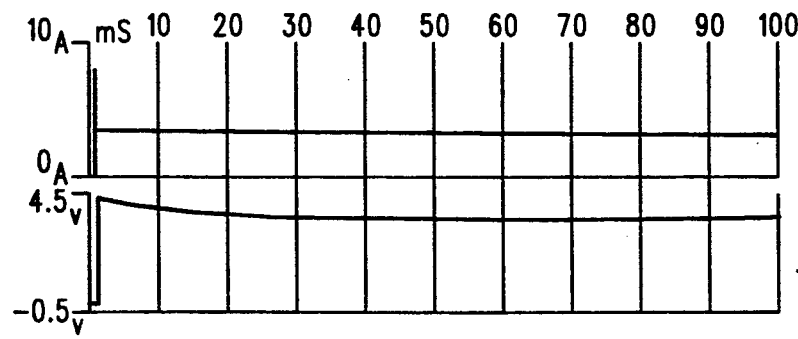
*FIG.5A*
*FIG.5B*

CIRCUIT FOR DRIVING A LOAD AND FOR PRODUCING A SIGNAL INDICATIVE OF THE CONDITION OF THE LOAD

BACKGROUND OF THE INVENTION

This invention relates to drive circuits for producing signals indicative of load condition. Such circuits find use in, for example, automotive vehicles, where it is desirable to monitor the condition of vehicle lamps so as to be able to warn the driver if the lamp is not operating.

Known circuits for monitoring the condition of vehicle lamps require a series resistance of known value to be inserted into the vehicle wiring harness, and use the voltage developed across the resistance to indicate the condition of a lamp supplied with current through the resistance.

Such a known circuit requires an additional component of accurately known value and produces a reliably indicative condition signal only when the load current to the circuit has stabilized after turn-on. Also, the value of the additional series resistance must be kept low in order to minimize resistive heating and to deliver sufficient energy to the lamp, but a low value resistance value produces a low voltage thereacross which results in a low signal-to-noise ratio.

SUMMARY OF THE INVENTION

It is an object of the present invention to provide an improved circuit for producing a signal indicative of the condition of a load wherein the above disadvantages may be overcome or at least alleviated.

In accordance with the present invention there is provided a circuit for producing a signal indicative of the condition of a load, the circuit comprising:
  means for applying current to the load;
  means for sensing the level of the applied current;
  means for detecting when the sensed level exceeds a predetermined threshold; and
  means for producing a reduction control signal to limit the applied current until the load current falls below the threshold,
whereby the reduction control signal is a pulse width modulated signal whose pulse width is indicative of the condition of the load and indicates a plurality of abnormal load conditions.

Since the reduction control signal is a pulse width modulated (PWM) signal, whose pulse width is indicative of the condition of the load, it is readily compatible with digital processing, is not critically dependent on individual component values and has a good signal-to-noise ratio.

BRIEF DESCRIPTION OF THE DRAWINGS

One circuit for driving an automotive lamp and for producing a signal indicative of the condition of the lamp will now be described, by way of example only, with reference to the accompanying drawings, in which:

FIGS. 2a-2b, 3a-3b, 4a-4b and 5a-5b show load current and sensed voltage waveforms occurring in the circuit of FIG. 1 for various lamp conditions.

DESCRIPTION OF THE PREFERRED EMBODIMENT

Figure 1:
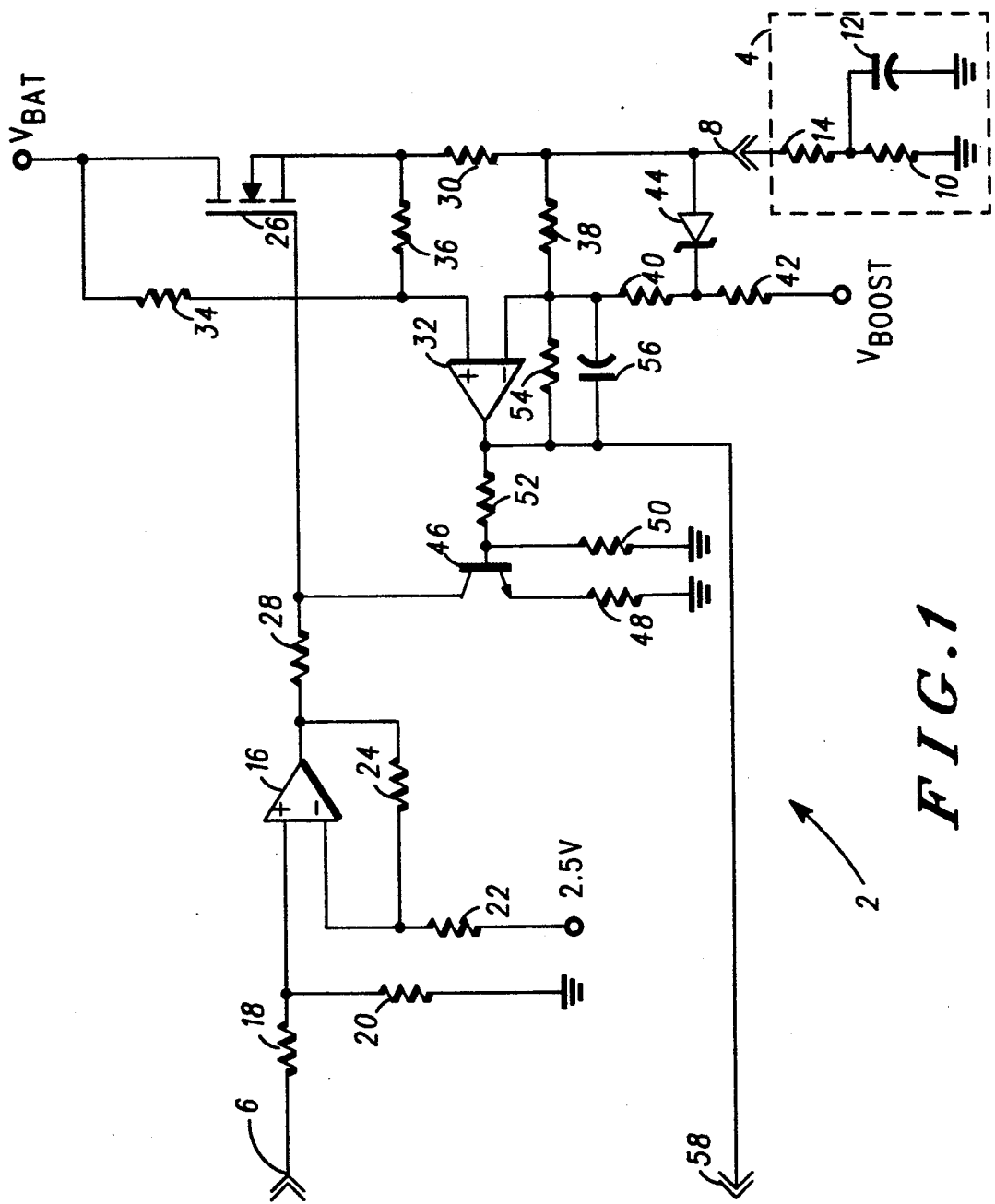
FIG. 1 shows a schematic circuit diagram of the circuit.

Referring now to FIG. 1 a circuit 2 for driving automotive vehicle lamp 4 includes an input node 6 for receiving an input signal to enable lamp drive, and an output node 8 to which the lamp 4 is connected. The lamp is represented by its equivalent circuit of a resistance 10 (having a value of approximately 8.0Ω) and a capacitance 12 (having a value of approximately 2,000μF) connected in parallel with each other and in series with a common resistance 14 (having a value of approximately 0.8Ω). The lamp 4 is connected between the output node 8 and ground.

A differential amplifier 16 (of the type available under the designation LM2982) has its non-inverting input coupled to the input node 6 via a resistance 18 (having a value of approximately 2.2KΩ) and also coupled to ground via a resistance 20 (having a value of approximately 4.7kΩ. The differential amplifier 16 has its inverting input coupled, via a resistance 22 (having a value of approximately 2.2KΩ), to a supply line for receiving a potential of 2.5V. The differential amplifier 16 has its output coupled, via a resistance 24 (having a value of approximately 330KΩ), to its inverting input.

A field-effect transistor (FET) 26 has its drain electrode connected to a supply line for connection to the vehicle battery voltage $V_{BAT}$. The FET 26 has its gate electrode coupled, via a resistance 28 (having a value of approximately 100KΩ), to the output of the differential amplifier 16. The FET 26 has its source electrode coupled, via a resistance 30 (having a value of approximately 0.1Ω), to the outer node 8.

A differential amplifier 32 (like the differential amplifier 16, of the type available under the designation LM2982) has its non-inverting input coupled to the $V_{BAT}$ supply line via a resistance 34 (having a value of approximately 300KΩ) and also coupled to the source electrode of the FET 26 via a resistance 36 (having a value of approximately 6.2KΩ). The differential amplifier 32 has its inverting input coupled, via a resistance 38 (having values of approximately 7.5KΩ), to the output node 8. The differential amplifier 32 also has its inverting input coupled, via two series resistances 40 and 42 (having values of approximately 56KΩ and 47KΩ respectively), to a supply line for connection to a boost voltage $V_{BOOST}$ having a value of approximately twice the vehicle battery voltage $V_{BAT}$. The mid-point of the two series resistances 40 and 42 is coupled to the output node 8 via a Zener diode 44.

A bipolar npn transistor 46 has its collector electrode connected to the gate electrode of the FET 26. The bipolar transistor 46 has its emitter electrode coupled to ground via a resistance 48 (having a value of approximately 3.3KΩ). The bipolar transistor 46 has its base electrode coupled to ground via a resistance 50 (having a value of approximately 18KΩ). The bipolar transistor 46 also has its base electrode coupled to the output of the differential amplifier 32 via a resistance 52 (having a value of approximately 56KΩ).

The output of the differential amplifier 32 is also coupled to its inverting input via a resistance 54 (having a value of approximately 300KΩ) and a capacitance 56 (having a value of approximately 0.001μF) connected in parallel. The output of the differential amplifier 32 is also connected to a condition sense output node 58.

Referring now also to FIG. 2, in operation of the circuit of FIG. 1, an enabling signal, typically of logic level voltage, is applied to the input node 6. The applied enabling signal is voltage translated by the differential amplifier 16 to a level suitable for controlling the FET 26. The output of the differential amplifier 16 is current limited by the resistor 28 and is applied to the gate electrode of the FET 26.

When the FET 26 turns on, the voltage $V_{BAT}$ is applied through the FET 26 and the resistance 30 to the lamp 4. The initial application of the voltage causes an initial in-rush of current, resulting from the capacitive nature of the lamp load, as the capacitor 12 begins to charge. The lamp current for a normal, operable lamp is shown in FIG. 2a. Typically, left uncontrolled, the in-rush of current peaks at a value of approximately 10A and lasts for no more than 5mS before settling to its steady-state value of the order of 1A. In a typical prior art circuit the in-rush current behaves in this way, reaching its full peak value before rapidly settling to its steady-state value. However, in the circuit of FIG. 1, as will be explained hereafter, the in-rush current is limited to a value substantially less than its uncontrolled peak value, lengthening the total time taken for the in-rush current to reach its steady-state value and resulting in the production of a signal indicative of the condition of the lamp 4.

In the circuit of FIG. 1, the level of the current applied to the lamp is sensed by the differential amplifier 32. The current flowing to the lamp develops a voltage across the resistance 30, and this voltage is applied (across the resistances 36 and 38) across the differential amplifier 32. When the current to the lamp exceeds a level of approximately 2A (which level is determined principally by the values of the resistances 38 and 40), the output of the differential amplifier 32 goes high, causing the bipolar transistor 46 to turn on. The output voltage of the differential amplifier 32 for a normal, operable lamp is shown in FIG. 2b. When the bipolar transistor 46 turns on, it conducts charge away from the gate electrode of the FET 26, lowering the control voltage applied to the FET 26 and so reducing the current flowing through the FET to the lamp.

It will be appreciated that in this way the differential amplifier 32 and the bipolar transistor 46 complete a feedback loop, maintaining the current applied to the lamp at a level no greater than the predetermined level of approximately 2A. In practice the response time of the feedback loop is rapid low e.g. of the order of tens of microseconds, ensuring rapid control of the current level. It will also be appreciated that the output of the differential amplifier 32 functions as an error signal, indicating that the current applied to the lamp should be reduced below the threshold value of approximately 2A.

As the capacitor 12 approaches its fully-charged state and the in-rush current to the lamp begins to fall, the current applied to the lamp falls to below the threshold of approximately 2A, and the output of the differential amplifier 32 goes low and the bipolar transistor 46 then turns off. The current applied to the lamp then continues to fall to its steady-state value of typically 1A. The feedback loop is thus effectively taken out of circuit and the output of the differential amplifier 16 directly controls the FET 26 to drive the lamp 4.

As can be seen in FIG. 2, by limiting the current applied to the lamp 4 in this way, for a lamp in operable condition the in-rush current to the lamp lasts for a substantially longer time than an uncontrolled in-rush current: typically the limited in-rush current in the circuit of FIG. 1 lasts for approximately more than 10mS, compared with typically 5mS or less for uncontrolled in-rush current. It will be appreciated that the length of time occupied by the in-rush current is represented by the length of time for which the error signal, produced at the output of the differential amplifier 32, is high.

It will be understood that the length of time for which the in-rush current lasts is indicative of the the condition of the lamp 4:

For a single lamp in operable condition, the lamp current and the error signal (produced at the output of the differential amplifier 32) will be typically as shown in FIG. 2a and FIG. 2b respectively. The limited in-rush current (FIG. 2a) lasts for more than 10s, and the error signal (FIG. 2b) is high only for as long as the in-rush current lasts.

For two similar lamps connected in parallel and in operable condition, the lamp current and the error signal (produced at the output of the differential amplifier 32) will be typically as shown in FIG. 3a and FIG. 3b respectively. The limited in-rush current (FIG. 3a) lasts for more than 20s, and the error signal (FIG. 3b) is high only for as long as the in-rush current lasts.

For an open-circuited load, the lamp current and the error signal (produced at the output of the differential amplifier 32) will be typically as shown in FIG. 4a and FIG. 4b respectively. The limited in-rush current (FIG. 4a) lasts for less than 1mS immediately the circuit is enabled (when the FET 26 is initially turned on), and the error signal (FIG. 4b) is also high only for this very short time.

For an short-circuited load, the lamp current and the error signal (produced at the output of the differential amplifier 32) will be typically as shown in FIG. 5a and FIG. 5b respectively. The limited in-rush current (FIG. 5a) lasts indefinitely, and the error signal (FIG. 4b) remains high indefinitely.

Thus, it will be appreciated that the error signal generated at the output of the differential amplifier 32 is a pulse width modulated (PWM) signal containing a single pulse which is generated at initial enabling of the load and which has a width indicative of the condition of the load.

The error signal generated at the output of the differential amplifier is amplitude-shaped by the two resistances 50 and 52 to be of a level which is directly compatible with digital circuitry (e.g. a microprocessor). The condition sense output node 58 is typically connected to a microprocessor (not shown) which is programmed to sense the width of the error signal pulse to detect the condition of the load.

In a circuit in which two similar lamps are connected in parallel as the load, the microprocessor may be programmed to respond to the error signal going high by sampling the level of the error signal at intervals of 5mS thereafter. Thus, the microprocessor may sense the following:
i) if at the first sampling (5mS after initially going high):
  a) the error signal is low, then the load is open-circuited (FIG. 4) and the microprocessor should stop sampling the error signal; or
  b) the error signal is high, then either at least one lamp is in satisfactory operating condition (FIG. 2 or FIG. 3) or the load is short-circuited (FIG. 5); in either case the microprocessor should continue sampling the error signal;

ii) if at the next sampling (10mS after initially going high):
   a) the error signal is low, then only one of the lamps is in satisfactory operating condition (FIG. 2) and the other lamp is open-circuited (FIG. 4); in either case the microprocessor should stop sampling the error signal; or
   b) the error signal is high, then either both lamps are in satisfactory operating condition (FIG. 3) or the load is short-circuited (FIG. 5); in either case the microprocessor should continue sampling the error signal;

iii) if at the next sampling (15mS after initially going high):
   a) the error signal is low, then both lamps are in satisfactory operating condition (FIG. 3); the microprocessor should stop sampling the error signal; or
   b) the error signal is high, then the load is short-circuited (FIG. 5); the microprocessor should stop sampling the error signal and should terminate drive to the load by disabling the input to the circuit at input node 6.

Thus, the circuit of FIG. 1 provides an output signal at the condition sense output node 58 which is indicative of the condition of the load, and may be used to disable drive to the load in the event that the load is short-circuited. In this way the drive circuit of FIG. 1 may be made self-protecting.

It will be appreciated that by limiting the level of the in-rush current in the circuit of FIG. 1, the PWM error signal, which is produced at the condition sense output node 58 and whose pulse width is indicative of the condition of the load, is readily compatible with digital processing, is not critically dependent on individual component values and has a good signal-to-noise ratio.

It will be appreciated that although the invention has been described in the above example in relation to lamps in automotive vehicles, the invention may alternatively be applied to sensing the condition of any load which is capacitive.

It will be appreciated that various other modifications or alternatives to the above described embodiment will be apparent to the man skilled in the art without departing from the inventive concept of limiting the level in-rush current so as to produce an error signal which is indicative of load condition.

I claim:

1. A circuit for driving a load and for producing a signal indicative of the condition of the load, the circuit comprising:
   means for applying current to the load;
   means for sensing the level of the applied current;
   means for detecting when the sensed level exceeds a predetermined threshold; and
   means for producing a reduction control signal to limit the applied current until the load current falls below the threshold,
   whereby the reduction control signal is a pulse width modulated signal whose pulse width is indicative of the condition of the load and indicates a plurality of abnormal load conditions.

2. A circuit according to claim 1 wherein the means for applying current to the load comprises first transistor means.

3. A circuit according to claim 2 wherein the first transistor means comprises field effect transistor means.

4. A circuit according to claim 1 wherein the means for sensing the level of the applied current comprises a resistance.

5. A circuit according to claim 1 wherein the means for detecting when the sensed level exceeds a predetermined threshold comprises first differential amplifier coupled to the means for sensing the level of the applied current.

6. A circuit according to claim 1 wherein the means for producing a reduction control signal to limit the applied current until the load current falls below the threshold comprises second transistor means coupled between the means for applying current to the load and the means for detecting when the sensed level exceeds a predetermined threshold.

7. A circuit according to claim 6 wherein the second transistor means comprises bipolar transistor means.

8. A circuit according to claim 7 wherein the bipolar transistor means comprises a npn transistor.

9. A circuit according to claim 1 further comprising level translator means coupled to the means for applying current to the load.

10. A circuit according to claim 9 wherein the level translator means comprises a second differential amplifier means.

11. A drive circuit for driving a load and for producing a signal indicative of the condition of the load, the circuit comprising:
   first transistor means for applying current to the load;
   resistance means for sensing the level of the applied current;
   differential amplifier means for detecting when the sensed level exceeds a predetermined threshold; and
   second transistor means for producing a reduction control signal to limit the applied current until the load current falls below the threshold;
   whereby the reduction control signal is a pulse width modulated signal whose pulse width is indicative of the condition of the load and indicates a plurality of abnormal load conditions.

* * * * *